Oct. 7, 1930.   C. TROVATO   1,777,944

COMBINED AQUARIUM AND PICTURE

Filed March 20, 1930   2 Sheets-Sheet 1

INVENTOR
Charles Trovato

By Bryant & Lowry
Attorneys

Oct. 7, 1930.   C. TROVATO   1,777,944
COMBINED AQUARIUM AND PICTURE
Filed March 20, 1930    2 Sheets-Sheet 2
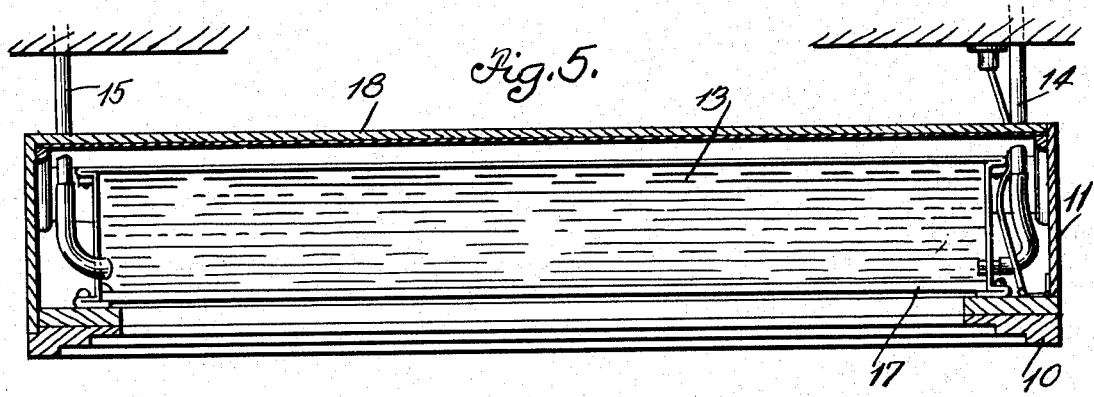
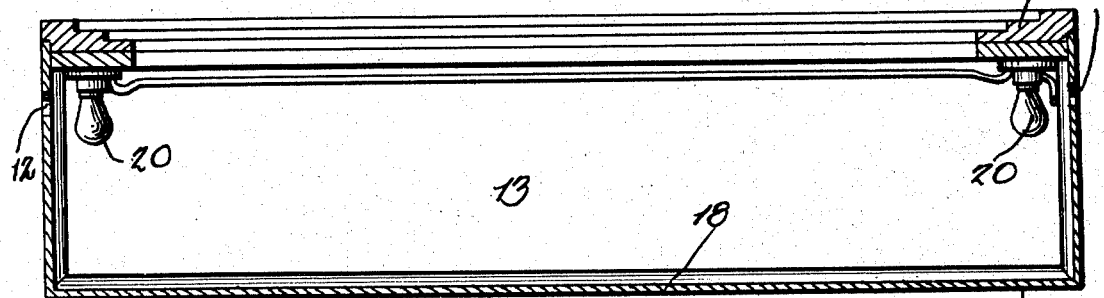
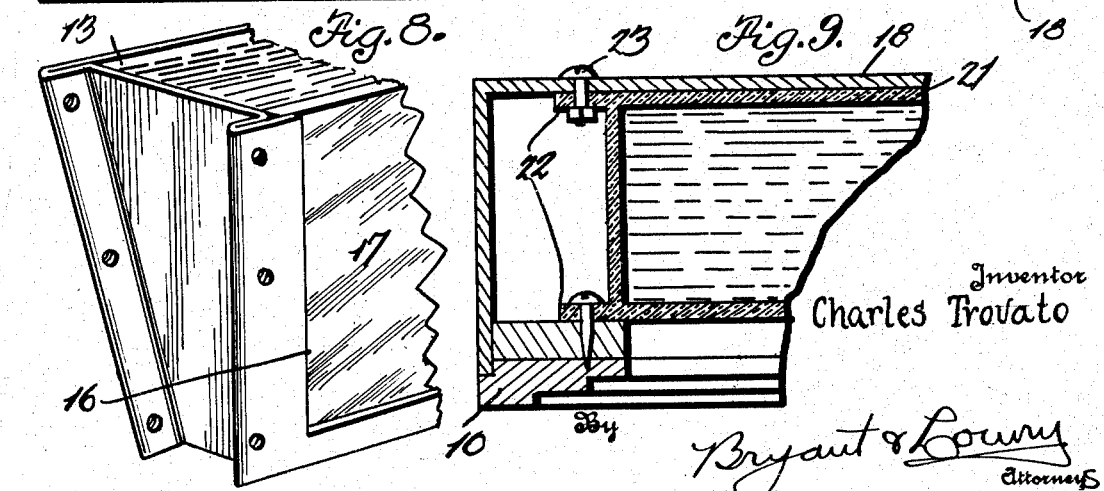
Inventor
Charles Trovato
By Bryant & Lowry
Attorneys Patented Oct. 7, 1930

1,777,944

UNITED STATES PATENT OFFICE

CHARLES TROVATO, OF CORONA, NEW YORK

COMBINED AQUARIUM AND PICTURE

Application filed March 20, 1930. Serial No. 437,457.

The invention relates to fish fonts, and more especially to aquariums.

The primary object of the invention is the provision of an aquarium, wherein the container for the fish is set in association with scenery framed to give the effect of a picture, the scene being congruent with a body of water, so as to render the aquarium attractive and unique to the eyes of a person.

Another object of the invention is the provision of an aquarium of this character, wherein the construction thereof is novel in form, and of a construction to permit fresh water admitted constantly to the fish well, and also to allow of the lighting of the scenic effect in association with the latter, so as to give sunset rays thereto, thus rendering the aquarium beautiful in appearance.

A further object of the invention is the provision of an aquarium of this character, wherein the assemblage of the same is novel in form for neatness and attractiveness.

A still further object of the invention is the provision of an aquarium of this character, wherein proper ventilation is assured and the necessity for hand bailing of stale water from the fish container is entirely eliminated, as fresh water is constantly supplied without attention on the part of a user of the aquarium.

A still further object of the invention is the provision of an aquarium of this character, which is comparatively simple in construction, reliable and efficient in purpose, neat and attractive in appearance, requiring no attention except for cleaning the fish container as the occasion requires, and inexpensive to manufacture and install.

With these and other objects in view the invention consists in the features of construction, combination and arrangement of parts as will be hereinafter more fully described in detail, illustrated in the accompanying drawings, which show the preferred embodiment of the invention, and pointed out in the claims hereunto appended.

It is to be understood however that changes, variations and modifications may be made in the invention as fall properly within the scope the claims hereunto appended without departing from the spirit of the invention or sacrificing any of its advantages.

In the accompanying drawings:

Figure 5, is a sectional view on the line 5—5 of Figure 1.

Figure 6, is a sectional view on the line 6—6 of Figure 1.

Figure 7, is a sectional view on the line 7—7 of Figure 1.

Figure 8, is a fragmentary perspective view of the fish container detached from the aquarium.

Figure 9, is a fragmentary horizontal sectional view through the aquarium showing a modified form of fish container Similar reference characters indicate corresponding parts throughout the several views in the drawings.

Figure 1:
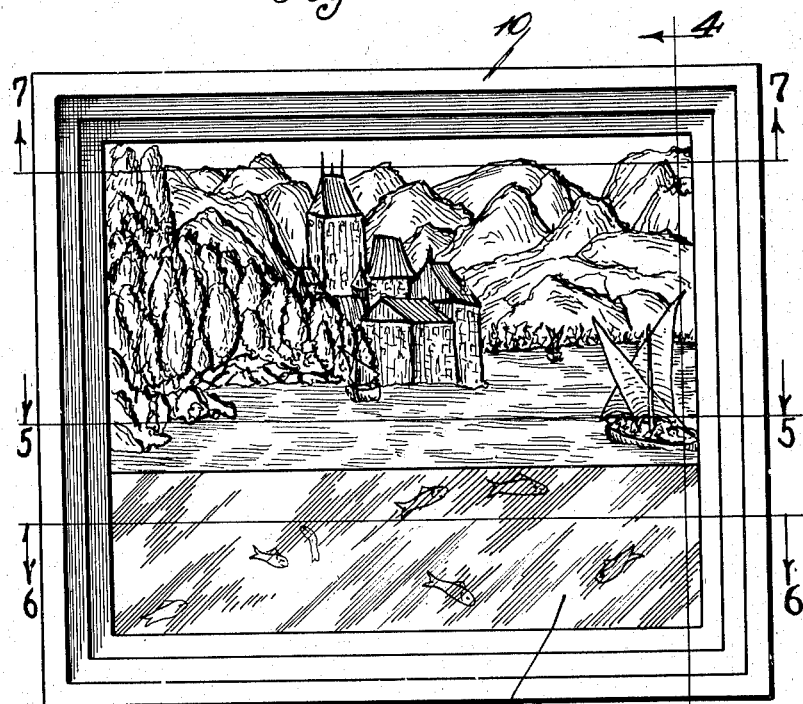
Figure 1, is a front elevation of the aquarium constructed in accordance with the invention.
Figure 2:
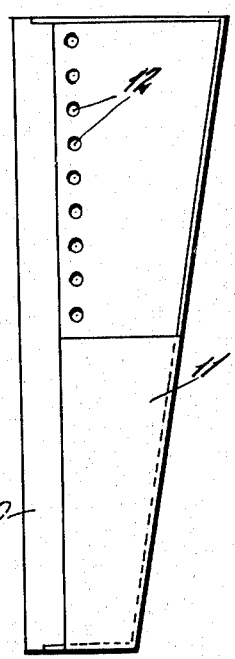
Figure 2, is an end elevation thereof.
Figure 3:
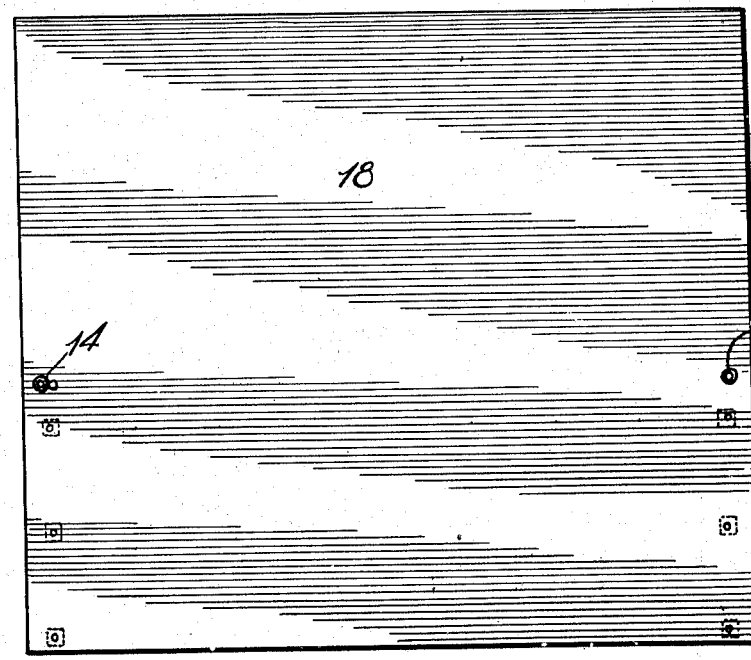
Figure 3, is a rear elevation.
Figure 4:
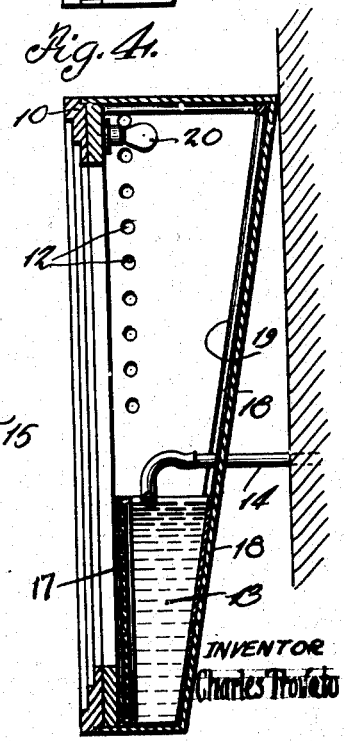
Figure 4, is a sectional view taken approximately on the line 4—4 of Figure 1, looking in the direction of the arrows.

Referring to the drawings in detail, the aquarium comprises a picture frame 10, which may be ornamented in any desirable manner, and to this frame at its back is secured a box-like body 11, which constitutes a backing for the frame. The body 11, is preferably tapered from top to bottom, so that the lower portion gradually narrows to the bottom of said frame, for a purpose presently described.

This body 11, in its side walls at the upper half thereof is provided with ventilating orifices or holes 12, while the frame center is entirely open which also increases ventilation.

Located within the body 11, in the lower portion of the same is a fish container or well 13, which is correspondingly shaped to said lower portion, and adapted to hold water, the latter being let into the same through the feed lead 14, and said water discharged therefrom through an overflow or drain-off 15. The lead 14 and the overflow or drain-off may be of any desirable construction suitable to the aquarium.

Preferably the container or well 13, is in the form of a metal body having an open front 16, closed by a glass panel 17, which is secured in a manner to render the container or well liquid tight about the latter, so that through this panel the fish within the container or well can be visible through the frame 10, which is adapted to be supported upon a vertical wall in any desirable fashion.

On the inner face of the back 18, of the body 11, is suitably secured a scene or picture 19, which entirely covers said back above the container or well and is visible through the open center of the frame 10, as will be apparent.

Arranged on the back of the frame 10, at its upper portion are suitable electric illuminating bulbs 20, one being preferably of blue tint and the other of yellow tint, so that on illumination the rays therefrom will be thrown onto the scene or picture to give a sunset effect thereto. The bulbs 20, are adapted to be arranged in an electric house circuit, and the connections may be of any suitable type.

In Figure 9, of the drawings there is shown a slight modification of fish container or well, wherein the body 21, is entirely made from glass and flanged at 22, at its ends, through which fasteners 23, pass for securing it in place.

What is claimed is:

1. The combination with a frame, of a picture supported for visibility through the frame and set inwardly thereof, a container located beneath the picture and visible through the frame, a transparent front to the container, means for illuminating the picture and mounted between the frame and picture, and means for supplying and discharging water to and from the container, and ventilated means constituting an enclosure at the back of the frame and supporting the container.

2. In an aquarium of the kind described, an open frame, a backing on the frame and disposed at an inclination, a fish well within the lower portion of the backing, a transparent front to the well, a picture on the upper portion of the backing and visible through the frame, and means carried by the frame for illuminating the picture to give coloring effect to the latter.

3. In an aquarium of the kind described, an open frame, a backing on the frame for forming a ventilating enclosure and having an inclined back proper, a fish well within the lower portion of the backing, a transparent front to the well, a picture on the upper portion of the front face of the back proper and visible through the frame, means carried by the frame for illuminating the picture to give coloring effect to the latter, and means for supplying and draining water to and from the well.

In testimony whereof I affix my signature.

CHARLES TROVATO.